US011922233B2

(12) United States Patent
Kinoshita et al.

(10) Patent No.: US 11,922,233 B2
(45) Date of Patent: Mar. 5, 2024

(54) INFORMATION CREATION DEVICE, INFORMATION CREATION METHOD, AND INFORMATION CREATION PROGRAM

(71) Applicant: NIPPON TELEGRAPH AND TELEPHONE CORPORATION, Tokyo (JP)

(72) Inventors: Kazumi Kinoshita, Tokyo (JP); Takeshi Nakatsuru, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 109 days.

(21) Appl. No.: 17/297,223

(22) PCT Filed: Nov. 13, 2019

(86) PCT No.: PCT/JP2019/044546
§ 371 (c)(1),
(2) Date: May 26, 2021

(87) PCT Pub. No.: WO2020/110727
PCT Pub. Date: Jun. 4, 2020

(65) Prior Publication Data
US 2022/0027218 A1 Jan. 27, 2022

(30) Foreign Application Priority Data
Nov. 29, 2018 (JP) ................. 2018-224105

(51) Int. Cl.
G06F 9/54 (2006.01)
(52) U.S. Cl.
CPC .................... *G06F 9/544* (2013.01)
(58) Field of Classification Search
CPC ........................................ G06F 9/544
See application file for complete search history.

(56) References Cited

U.S. PATENT DOCUMENTS 5,539,886 A * 7/1996 Aldred ............... G06F 9/544
379/202.01
2006/0271557 A1 * 11/2006 Harward ............... G06F 9/52
(Continued)

FOREIGN PATENT DOCUMENTS

CN 101819525 A 9/2010
JP 4863449 B2 8/2007
(Continued)

OTHER PUBLICATIONS

RPM Package Manager, [online] Internet <URL: http://rpm.org/> [Retrieved on Nov. 13, 2018].

(Continued)

*Primary Examiner* — Kevin L Young
*Assistant Examiner* — Carina Yun

(57) ABSTRACT

An information creating device includes processing circuitry configured to identify, for a plurality of applications, one or more files that are accessed due to activation or operation of an application of the plurality of applications during the activation or the operation of the application, identify, for the plurality of applications, one or more other applications that transmit and receive data to and from the application, and store, in a memory, associated file information that indicates, for the plurality of applications, the one or more files accessed during the activation or the operation of the application as associated files of the application, and associated application information that indicates, for the plurality of applications, the one or more other applications that transmit and receive data to and from the application as associated application of the application.

8 Claims, 5 Drawing Sheets

(56) References Cited

U.S. PATENT DOCUMENTS

| | | | |
|---|---|---|---|
| 2010/0223306 A1 | 9/2010 | Liu et al. | |
| 2011/0320508 A1* | 12/2011 | Naito | H04L 67/125 |
| | | | 707/827 |
| 2016/0078347 A1 | 3/2016 | Salajegheh et al. | |
| 2018/0293394 A1* | 10/2018 | Gunda | G06F 9/45558 |
| 2019/0065065 A1* | 2/2019 | Huang | G06F 3/065 |

FOREIGN PATENT DOCUMENTS

| | | |
|---|---|---|
| JP | 2015114731 A | 6/2015 |
| JP | 2017-536594 A | 12/2017 |
| JP | 2018-085040 A | 5/2018 |

OTHER PUBLICATIONS

Yamashita et al. (2018) "Attack Process Detection Based on File Event Monitoring and White Lists" DEIM Forum Mar. 6, 2018 (16th Annual Meeting of the Database Society of Japan).

* cited by examiner

| PROCESS NAME OF APPLICATION | FILE PATHS OF ASSOCIATED FILES |
|---|---|
| AP1 | /a/b/f1 |
|  | /c/f2 |
|  | ...... |

| PROCESS NAME OF APPLICATION | PROCESS NAMES OF ASSOCIATED APPLICATIONS |
|---|---|
| AP1 | AP2 |
|  | AP3 |
|  | ...... |

Fig. 3

| PROCESS NAME OF APPLICATION | CONFIGURATION FILE PATHS |
|---|---|
| AP1 | /d/e/f3 |
|  | /g/f4 |
|  | ...... |

Fig. 4

INFORMATION CREATION DEVICE, INFORMATION CREATION METHOD, AND INFORMATION CREATION PROGRAM

CROSS-REFERENCE TO RELATED APPLICATIONS

This application is a U.S. 371 Application of International Patent Application No. PCT/JP2019/044546, filed on 13 Nov. 2019, which application claims priority to and the benefit of JP Application No. 2018-224105, filed on 29 Nov. 2018, the disclosures of which are hereby incorporated herein by reference in their entireties.

TECHNICAL FIELD

The present invention relates to an information creating device, an information creating method, and an information creating program.

BACKGROUND ART

In order to prevent an application from operating abnormally, it is necessary that the application not be in operation in a state where integrity has been damaged. Further, an operating state refers to a state in which the process is being generated (that is, provided with a process ID), and not in an operating state (stopped state) refers to a state where the process is stopped.

What is associated to the operation of the application is here, for example, as follows.

(1) Those managed by application developers (for example, application execution files, setting files, libraries, and the like)

(2) Those managed by those other than application developers and directly related to operation (for example, shared library, and the like)

(3) Those managed by those other than application developers, and do not directly relate to operation, but are required in service offerings (for example, other applications that operate in cooperation with the application, and the like)

In order to prevent the application from operating abnormally, it is necessary to check the integrity of what is associated to the operation of the application (which may affect operations).

For example, the case that three applications (APs) of AP1 through AP3 cooperate to provide a service will be considered. In this case, in order to properly operate the service, for example, it is necessary not only checking the integrity of AP1 to control the operation, but also checking the integrity of AP2 and AP3 to control the operation.

In this way, it is important to check the integrity of files and applications that may affect the operation of the application in order to prevent the application from operating abnormally.

CITATION LIST

Patent Literature

Patent Literature 1: Japanese Patent No. 4863449 B

Non Patent Literature

Non Patent Literature 1. RPM Package Manager, [online], [Retrieved on Nov. 13, 2018], Internet <URL: http://rpm.org/>

SUMMARY OF THE INVENTION

Technical Problem

However, in the related art, identification of files and applications that may affect the operation of certain application has been performed manually by those who create the application (see Patent Literature 1 and Non Patent Literature 1), so it takes time to identify and there is also an omission in the identified information. Therefore, an object of the present invention is to resolve the problems described above and automatically create file and application information that may affect the operation of the application.

Means for Solving the Problem

In order to solve the problems described above, the information creating device includes processing circuitry configured to identify, for a plurality of applications, one or more files that are accessed due to activation or operation of an application of the plurality of applications during the activation or the operation of the application, identify, for the plurality of applications, one or more other applications that transmit and receive data to and from the application, and store, in a memory, associated file information that indicates, for the plurality of applications, the one or more files accessed during the activation or the operation of the application as associated files of the application, and associated application information that indicates, for the plurality of applications, the one or more other applications that transmit and receive data to and from the application as associated application of the application.

Effects of the Invention

According to the present invention, files and application information that can affect the operation of an application can be automatically created.

BRIEF DESCRIPTION OF DRAWINGS

FIG. 3 is a diagram illustrating an example of associated AP information of FIG. 1.

FIG. 4 is a diagram illustrating an example of the associated configuration file information of FIG. 1.

DESCRIPTION OF EMBODIMENTS

Figures 1, 2:
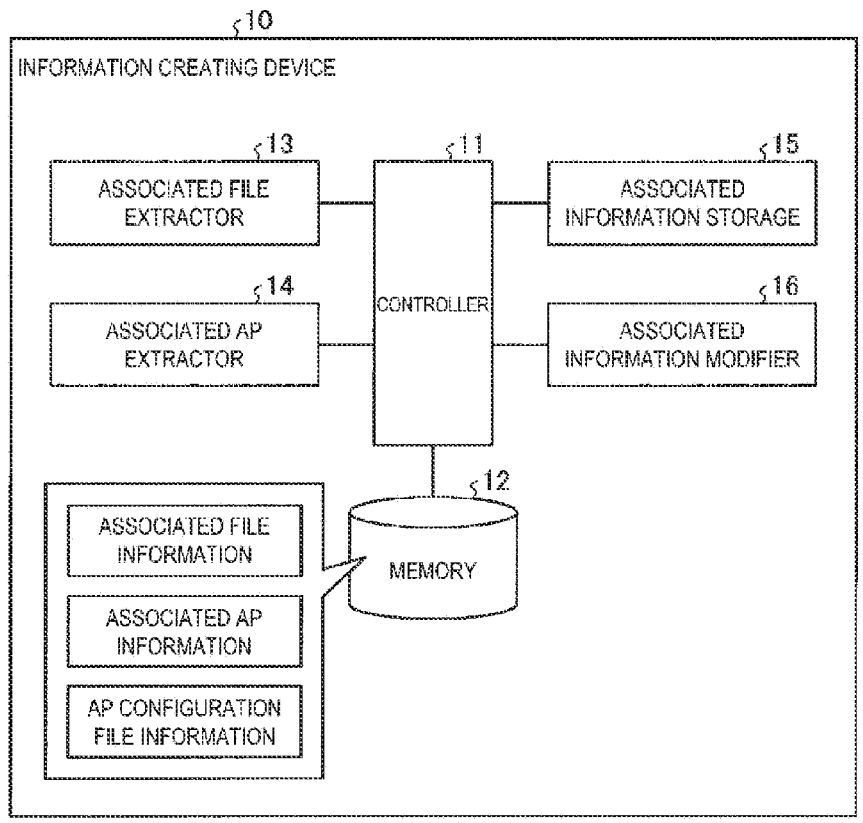
FIG. 1 is a diagram illustrating a configuration example of an information creating device.
FIG. 2 is a diagram illustrating an example of associated file information of FIG. 1.

Hereinafter, embodiments of the present invention will be described with reference to drawings. A configuration example of an information creating device 10 according to this embodiment will be described using FIG. 1. Further, an AP for which information is created by the information creating device 10 may be an AP operating in the information creating device 10, or may be an AP operating outside the information creating device 10.

Configuration Example

The information creating device 10 creates information indicating a file (associated file) that can affect the operation of the AP and information indicating an AP (associated AP) that can affect the operation of the AP. Here, the information creating device 10 uses, for example, information of one or more files accessed by activation or operation of the AP as information indicating the associated file. The information creating device 10 uses, for example, information of other APs (associated APs) that operate in cooperation with the AP as information indicating associated APs.

The information creating device 10 includes, for example, a controller 11, a memory 12, an associated file extractor (associated file identifier) 13, an associated AP extractor (associated AP identifier) 14, an associated information storage (information creator) 15, and an associated information modifier 16.

The controller 11 controls the memory 12, the associated file extractor 13, the associated AP extractor 14, the associated information storage 15, and the associated information modifier 16.

For each AP, the associated file extractor 13 extracts one or more files (associated files) that are accessed due to activation or operation of the AP during activation or operation of the AP. These associated files include, for example, a file of a shared library used for APs.

For example, the associated file extractor 13 extracts one or more files (associated files) that are accessed due to activation or operation of the AP during activation or operation of the AP using an operating system (OS) operating the AP. Details of the associated file extractor 13 are described below.

The associated AP extractor 14 extracts an associated AP for each AP. For example, the associated AP extractor 14 uses the OS to extract one or more other APs that transmit and receive data to and from the AP as associated APs of the AP. Details of this associated AP extractor 14 are described below.

The associated information storage 15 creates associated file information (see FIG. 2) based on the processing result of the associated file extractor 13. The associated information storage 15 creates associated AP information (see FIG. 3) based on the processing result of the associated AP extractor 14.

For example, the associated information storage 15 creates, for each AP, associated file information indicating the associated file for the AP using the information of associated file of each AP extracted by the associated file extractor 13, and stores the associated file information in the memory 12. Further, the associated information storage 15 creates, for each AP, associated AP information indicating the associated AP for the AP using the information of associated AP of each AP extracted by the associated AP extractor 14, and stores the associated AP information in the memory 12.

After creation of the associated file information, the associated information storage 15 updates the associated file information based on the processing result of the associated file extractor 13. In other words, when information of new associated file is extracted by the associated file extractor 13, the associated information storage 15 updates the associated file information using the information. In addition, after creation of the associated AP information, the associated information storage 15 updates the associated AP information based on the processing result of the associated AP extractor 14. In other words, when information of new associated AP is extracted by the associated AP extractor 14, the associated information storage 15 updates the associated AP information using the information.

The associated information modifier 16 modifies the associated file information and the associated AP information based on the instruction input from a user of the information creating device 10.

The memory 12 stores the associated file information and the associated AP information created by the associated information storage 15. The memory 12 stores AP configuration file information indicating a file composing the AP for each AP.

The associated file information is information indicating the associated file of the AP for each AP. This associated file information is, for example, information indicating a name of a process of the AP and a file path of the associated file of the process associated with each other as illustrated in FIG. 2.

For example, in a case where there is some anomaly, such as falsification, of the associated file indicated in this associated file information, it is determined that the AP corresponding to the associated file may not operate correctly (integrity is damaged).

The associated AP information is information indicating the associated AP of the AP for each AP. This associated AP information is information indicating a name of a process of the AP and a process name of the associated AP of the process associated with each other as illustrated in FIG. 3.

For example, in a case where any anomaly occurs in an associated AP indicated by this associated AP information, it is determined that the AP corresponding to the associated AP may not work correctly (integrity is damaged).

The AP configuration file information is information indicating a file composing the AP for each AP. The AP configuration file information is, for example, information indicating a name of a process of the AP and a configuration file path (a file path of a configuration file of the AP (for example, execution file of the AP, setting file, and the like)) of the process associated with each other as illustrated in FIG. 4.

For example, in a case where any anomaly occurs in a file indicated in this configuration AP information, it is determined that the AP represented by this configuration AP information may not operate correctly (integrity is damaged).

The AP configuration file information is input beforehand by the user of the information creating device 10, for example.

Example of Processing Procedure

Figure 5:
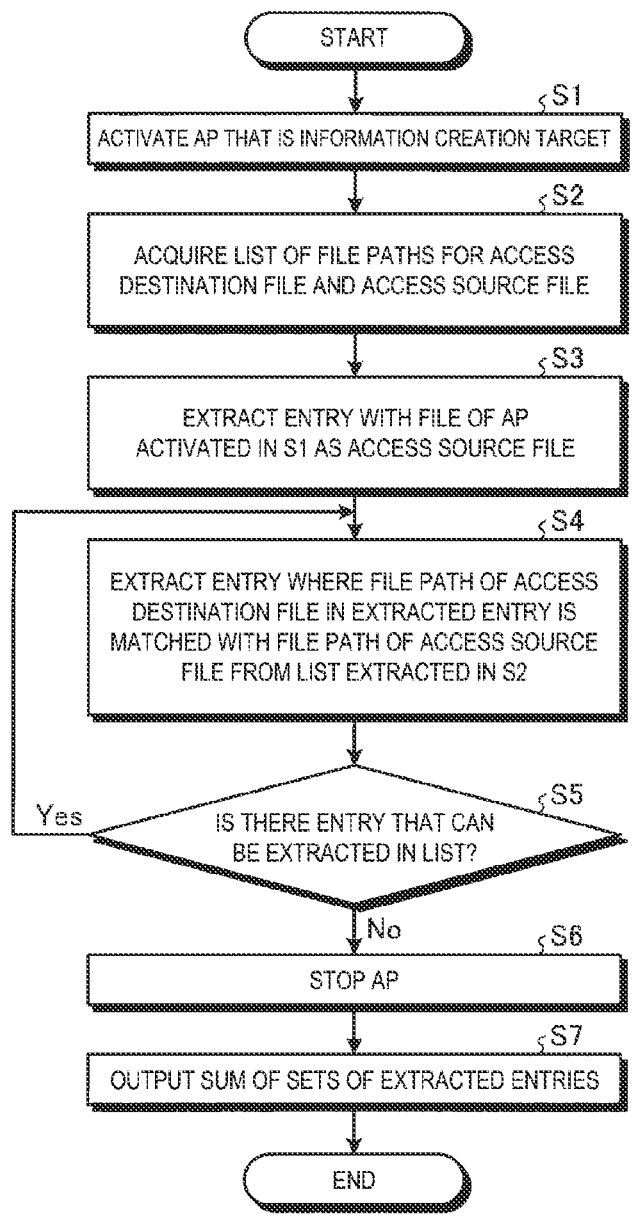
FIG. 5 is a flowchart illustrating an example of a procedure for creating the associated file information by the information creating device of FIG. 1.

Next, an example of a processing procedure of the information creating device 10 will be described. First, an example of a procedure for creating associated file information by the information creating device 10 will be described using FIG. 5. Here, a case in which the information creating device 10 creates associated file information related to the activation of the AP is described as an example.

First, the associated file extractor 13 of the information creating device 10 activates the AP that is information creation target (S1). Then, the associated file extractor 13 acquires a list of file paths of a file (access destination file) which has been accessed during until the AP is activated and a file (access source file) which has accessed the access destination file using functions (for example, fanotify which is an application programming interface (API) of Linux (trade name)) of the OS used by the AP (S2). That is, the associated file extractor 13 acquires, by the OS functions, a list indicating a file accessed from any file and the access source file of that file during until the AP activates.

After S2, the associated file extractor 13 extracts an entry, from the list obtained in S2, in which a file of the AP that has been activated in S1 is the access source file (S3). That is, the associated file extractor 13 extracts an entry whose access source file is a configuration file of the AP, from among the entries of the list acquired in S2 with reference to the AP configuration file information.

After S3, the associated file extractor 13 extracts an entry whose file path of the access source file is matched with a file path of the access destination file of the entry extracted in S3, from the list extracted in S2 (S4). If there is an entry which can be extracted from the list acquired in S2 (Yes in S5), the process returns to S4.

That is, the associated file extractor 13 traces a file that the AP accesses when the AP activates and a file that is accessed based on the access of the file using each entry of the list acquired in S2. Thereby, the associated file extractor 13 extracts one or more files (associated files) that are accessed in connection with the activation of the AP.

On the other hand, in S5, in a case where the associated file extractor 13 determines that there is no entry that can be extracted in the list acquired in S2 (No in S5), the AP is stopped (S6). The associated file extractor 13 then outputs the sum of sets of extracted entries to the associated information storage 15 (S7). In other words, the associated file extractor 13 outputs information of the associated file of the AP to the associated information storage 15. Then, the associated information storage 15 creates and stores the associated file information in the memory 12 based on the information of the associated file of the AP that has been output.

Further, in a case where the associated file extractor 13 extracts the associated file during operation of the AP, the same process as described above is executed when the AP is in an operating state.

Figure 6:
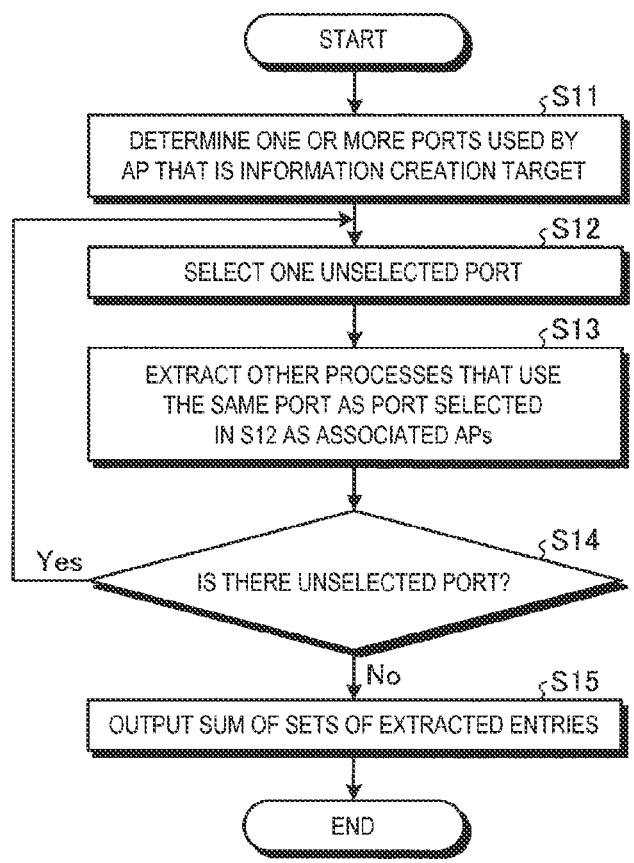
FIG. 6 is a flowchart illustrating an example of a procedure for creating the associated AP information by the information creating device of FIG. 1.

Next, an example of a procedure for creating associated AP information by the information creating device 10 will be described using FIG. 6. The associated AP extractor 14 of the information creating device 10 extracts the associated AP, for example, by extracting AP that uses the same port as the AP that is information creation target.

For example, first, when the associated AP extractor 14 determines one or more ports used by the AP that is information creation target using the functions of the OS (for example. Isof which is a command in Linux (trade name)) (S11), the associated AP extractor 14 selects one unselected port (S12) and extracts other processes using the same port as the port selected in S12 as the associated APs (S13). And, when there is an unselected port among the ports determined in S11 (Yes in S14), then the process returns to S12. When there is no unselected port among the ports determined in S1 (No in S14), the associated AP extractor 14 outputs the sum of sets of extracted entries (a set of associated APs) to the associated information storage 15 (S15). That is, the associated AP extractor 14 outputs the extracted information of the associated AP of the AP to the associated information storage 15. Then, the associated information storage 15 creates and stores the associated AP information in the memory 12 based on the information of the associated AP of the AP that has been output.

Further, when the AP transmits data to the other APs, the AP may add the information (for example, process name) of the AP to transmit source AP information of the data and transmits the information. Then, the associated AP extractor 14 may extract, as the associated AP, a series of transmit source AP information appended to the data transmitted and received by the AP.

Program

The functions of the information creating device 10 described in the embodiments above can be implemented by installing a program that achieves such functions into a desired information processor (computer). For example, the information processor can function as the information creating device 10 by causing the information processor to execute the above-mentioned program provided as package software or online software. The information processor described here includes a desktop or laptop personal computer, a rack-mount type server computer, or the like. Further, a mobile communication terminal such as a smartphone, a mobile phone, a personal handyphone system (PHS), and a personal digital assistant (PDA), and the like, in addition to the above, are included in a category of the information processor. The information creating device 10 can also be implemented on a cloud server.

Figure 7:
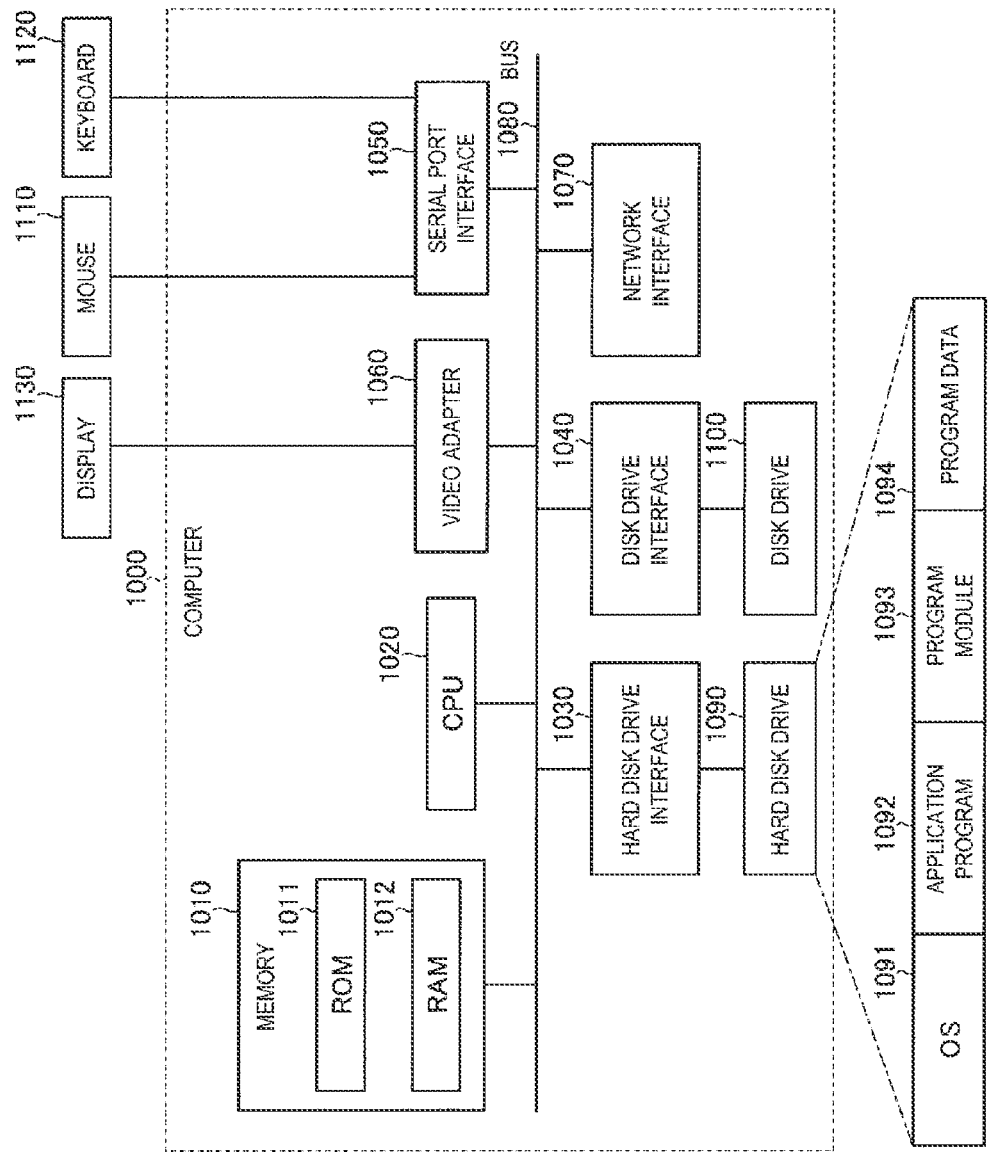
FIG. 7 is a diagram illustrating an example of a computer that executes an information creating program.

One example of a computer that executes the program (information creating program) described above will be described with reference to FIG. 7. As illustrated in FIG. 7, a computer 1000 includes, for example, a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a random access memory (RAM) 1012. The ROM 10l stores, for example, a boot program, such as a basic input output system (BIOS). The hard disk drive interface 1030 is connected to a hard disk drive 1090. The disk drive interface 1040 is connected to a disk drive 1100. A removable storage medium, such as a magnetic disk or an optical disk for example, is inserted into the disk drive 1100. A mouse 1110 and a keyboard 1120, for example, are connected to the serial port interface 1050. A display 1130, for example, is connected to the video adapter 1060.

Here, the hard disk drive 1090 stores, for example, an OS 1091, an application program 1092, a program module 1093, and program data 1094 as illustrated in FIG. 7. The various types of data and information described in the aforementioned embodiments are stored in, for example, the hard disk drive 1090 and the memory 1010.

The CPU 1020 loads the program module 1093 and the program data 1094, stored in the hard disk drive 1090, onto the RAM 1012 as appropriate, and executes each of the aforementioned procedures.

The program module 1093 and the program data 1094 related to the information creating program described above are not limited to the case where they are stored in the hard disk drive 1090. For example, the program module 1093 and the program data 1094 may be stored in a removable storage medium and read out by the CPU 1020 via the disk drive 1100 or the like. Alternatively, the program module 1093 and the program data 1094 related to the program described above may be stored in another computer connected via a network such as a LAN or a wide area network (WAN), and may be read by the CPU 1020 via the network interface 1070.

REFERENCE SIGNS LIST

10 Information creating device
11 Controller
12 Memory

13 Associated file extractor
14 Associated AP extractor
15 Associated information storage
16 Associated information modifier

The invention claimed is:

1. An information creating device comprising:
   at least one processor; and
   a memory storing a program comprising instructions that, when executed by the at least one processor, cause the device to perform a set of operations to:
   activate a first application;
   acquire, using an operating system associated with the first application while activating the first application, a file path list, wherein the file path list represents a set of file paths associated with files being accessed by another file while activating the first application, the file path list includes:
      a configuration file path associated with a configuration file of the first application,
      a first file path associated with a first file being accessed from a second file, and
      a second file path associated with the second file accessed by the configuration file;
   trace, starting from the configuration file associated with the first application, the second file and the first file as a series of accessed files according to the file path list;
   identify, based on a result of the trace of the configuration file and the second file, whether access to first file is caused by activation of the first application;
   extract, based on a result of identifying whether the access to the first file is caused by activation of the first application, the first file as an associated file of the associated file information associated with the first application, wherein the associated file is accessed in connection with the activation of the first application;
   deactivate, based at least on the extraction of the first file, the first application;
   identify a second application, wherein the second application transmits and receives data to and from the first application while activating the first application;
   store, in a memory, the associated file information associated with the first application;
   store, in the memory, associated application information associated with the first application, wherein the associated application information indicates the second application that transmits and receives the data to and from the first application while activating the first application;
   determine, based on anomaly in the association file information and the associated application information, a state of integrity associated the first application, wherein the state of integrity indicates whether there is anomaly in activating the first application; and
   execute, based on the determined state of integrity without anomaly, operation of the first application.

2. The information creating device according to claim 1, wherein the operations further:
   identify, using the operating system associated with the first application, the first file, wherein the access to the first file is caused by the activation of the first application while activating the first application.

3. The information creating device according to claim 1, wherein the operations further:
   identify, using the operating system associated with the first application, the second application, wherein the first application and the second application use an identical port while the first application transmits and receives the data to and from the second application.

4. The information creating device according to claim 1, wherein the state of integrity of the first application indicates anomaly according to falsification in the associated file information.

5. An information creating method comprising:
   activating a first application;
   acquiring, using an operating system associated with the first application while activating the first application, a file path list, wherein the file path list represents a set of file paths associated with files being accessed by another file while activating the first application, the file path list includes:
      a configuration file path associated with a configuration file of the first application,
      a first file path associated with a first file being accessed from a second file, and
      a second file path associated with the second file accessed by the configuration file;
   tracing, starting from the configuration file associated with the first application, the second file and the first file as a series of accessed files according to the file path list;
   identifying, based on a result of the trace of the configuration file and the second file, whether access to first file is caused by, activation of the first application;
   extracting, based on a result of identifying whether the access to the first file is caused by activation of the first application, the first file as an associated file of the associated file information associated with the first application, wherein the associated file is accessed in connection with the activation of the first application;
   deactivating, based at least on the extraction of the first file, the first application;
   identifying a second application, wherein the second application transmits and receives data to and from the first application while activating the first application;
   storing, in a memory, the associated file information associated with the first application;
   storing, in the memory, associated application information associated with the first application, wherein the associated application information indicates the second application that transmits and receives the data to and from the first application while activating the first application;
   determining, based on anomaly in the association file information and the associated application information, a state of integrity associated the first application, wherein the state of integrity indicates whether there is anomaly in activating the first application; and
   executing, based on the determined state of integrity without anomaly, operation of the first application.

6. The information creating method according to claim 5, wherein the state of integrity of the first application indicates anomaly according to falsification in the associated file information.

7. A non-transitory computer-readable recording medium storing therein an information creating program that causes a computer to execute a process comprising:

activating a first application;
    acquiring, using an operating system associated with the first application while activating the first application, a file path list, wherein the file path list represents a set of file paths associated with files being accessed by another file while activating the first application, the file path list includes:
        a configuration file path associated with a configuration file of the first application,
        a first file path associated with a first file being accessed from a second file, and
        a second file path associated with the second file accessed by the configuration file;
    tracing, starting from the configuration file associated with the first application, the second file and the first file as a series of accessed files according to the file path list;
    identifying, based on a result of the trace of the configuration file and the second file, whether access to first file is caused by activation of the first application;
    extracting, based on a result of identifying whether the access to the first file is caused by activation of the first application, the first file as an associated file of the associated file information associated with the first application, wherein the associated file is accessed in connection with the activation of the first application;
    deactivating, based at least on the extraction of the first file, the first application;
    identifying a second application, wherein the second application transmits and receives data to and from the first application while activating the first application;
    storing, in a memory, the associated file information associated with the first application;
    storing, in the memory, associated application information associated with the first application, wherein the associated application information indicates the second application that transmits and receives the data to and from the first application while activating the first application;
    determining, based on anomaly in the association file information and the associated application information, a state of integrity of the first application, wherein the state of integrity indicates whether there is anomaly in activating the first application; and
    executing, based on the determined state of integrity without anomaly, operation of the first application.

8. The non-transitory computer-readable recording medium according to claim 7, wherein the state of integrity of the first application indicates anomaly according to falsification in the associated file information.

* * * * *